US008339068B2

(12) United States Patent
Simmers

(10) Patent No.: US 8,339,068 B2

(45) Date of Patent: Dec. 25, 2012

(54) LED BRIGHTNESS CONTROL BY VARIABLE FREQUENCY MODULATION

(75) Inventor: Charles R. Simmers, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 610 days.

(21) Appl. No.: 12/576,346

(22) Filed: Oct. 9, 2009

(65) Prior Publication Data

US 2010/0148678 A1 Jun. 17, 2010

Related U.S. Application Data

(60) Provisional application No. 61/121,973, filed on Dec. 12, 2008.

(51) Int. Cl.

| | |
|---|---|
| ***G06F 1/00*** | (2006.01) |
| ***H05B 37/02*** | (2006.01) |
| ***H05B 39/04*** | (2006.01) |
| ***H05B 41/36*** | (2006.01) |

(52) U.S. Cl. ......................... 315/297; 315/158; 315/291

(58) Field of Classification Search ........................ None
See application file for complete search history.

(56) References Cited

U.S. PATENT DOCUMENTS

| | | | | |
|---|---|---|---|---|
| 5,924,784 | A * | 7/1999 | Chliwnyj et al. | 362/234 |
| 7,315,139 | B1 | 1/2008 | Selvan et al. | 315/291 |
| 2005/0122065 | A1 * | 6/2005 | Young | 315/294 |
| 2007/0103086 | A1 | 5/2007 | Neudorf et al. | 315/149 |

FOREIGN PATENT DOCUMENTS

| | | |
|---|---|---|
| WO | 2004/057923 | 7/2004 |
| WO | 2008/056321 | 5/2008 |

OTHER PUBLICATIONS

International PCT Search Report, PCT/US2009/067636, 14 pages, Mailed Mar. 18, 2010.

* cited by examiner

*Primary Examiner* — Douglas W Owens
*Assistant Examiner* — Dedei K Hammond
(74) *Attorney, Agent, or Firm* — King & Spalding L.L.P.

(57) ABSTRACT

Perceived intensity (brightness) of light from a light emitting diode (LED) is controlled with a pulse train signal having fixed pulse width and voltage amplitude and then increasing or decreasing the frequency (increasing or decreasing the number of pulses over a time period) of this pulse train signal so as to vary the average current through the LED. This reduces the level of electro-magnetic interference (EMI) at any one frequency by varying the pulse train energy spectrum over a plurality of frequencies.

20 Claims, 5 Drawing Sheets

LED BRIGHTNESS CONTROL BY VARIABLE FREQUENCY MODULATION

RELATED PATENT APPLICATIONS

This application claims priority to commonly owned U.S. Provisional Patent Application Ser. No. 61/121,973; filed Dec. 12, 2008; entitled "LED Intensity Control by Variable Frequency Modulation," by Charles R. Simmers; and is related to U.S. Patent Application Ser. No. 12/623,657; filed Nov. 23, 2009; entitled "Three-Color RGB Led Color Mixing and Control by Variable Frequency Modulation," by Charles R. Simmers; wherein both are hereby incorporated by reference herein for all purposes.

TECHNICAL FIELD

The present disclosure relates to controlling light emitting diodes (LEDs), and more particularly, to controlling the perceived intensity (brightness) of an LED by having a fixed pulse width and a fixed voltage signal, and increasing or decreasing the frequency thereof to vary the average current across the LED.

BACKGROUND

Pulse width modulation (PWM) is a known technology to control LED intensity. However, implementation of a PWM methodology to control LED light intensity (brightness) has been shown to sometimes be problematic in some applications that are sensitive to radiated noise emissions and/or flicker.

SUMMARY

What is needed is a way to vary the perceived output intensity (brightness) of an LED while minimizing radiated noise emissions and flicker. Variable frequency modulation (VFM) offers an alternative process to controlling LED intensity that may be easier for an end-user to implement, based on their particular system requirements. The resulting drive signal exhibits both lower power requirements, as well as lower electromagnetic interference (EMI) radiation then prior technology PWM designs.

According to the teachings of this disclosure, the perceived intensity (brightness) of an LED is controlled by using a pulse train signal having fixed pplse width and voltage amplitude, and then increasing or decreasing the frequency (increasing or decreasing the number of pulses over a time period) of this pulse train signal so as to vary the average current through the LED. This reduces the level of electro-magnetic interference (EMI) at any one frequency by varying the pulse train energy spectrum over a plurality of frequencies.

According to a specific example embodiment of this disclosure, an apparatus for controlling brightness of a light emitting diode (LED) comprises: a pulse generating circuit having a trigger input and a pulse output, wherein a plurality of trigger signals are applied to the trigger input and a plurality of pulses are thereby generated at the pulse output, wherein each of the plurality of pulses has a constant width and amplitude; a pulse on-time integrator having a pulse input coupled to the pulse output of the pulse generating circuit and an integration time interval input, wherein the pulse on-time integrator generates an output voltage proportional to a percent of when the amplitudes of the plurality of pulses are on over an integration time interval; an operational amplifier having negative and positive inputs and an output, the negative input is coupled to the output voltage from the pulse on-time integrator and the positive input of the operational amplifier is coupled to a voltage signal representing a desired light brightness from a light emitting diode (LED); and a voltage controlled frequency generator having a frequency control input and a frequency output, wherein the frequency control input is coupled to the output of the operational amplifier, and the frequency output generating the plurality of the trigger signals is coupled to the trigger input of the pulse generating circuit, whereby the voltage controlled frequency source causes the pulse generating circuit to produce the plurality of pulses necessary for producing the desired light brightness from the LED.

According to another specific example embodiment of this disclosure, an apparatus for controlling brightness of a light emitting diode (LED) comprises: a pulse generating circuit having a trigger input and a pulse output, wherein a plurality of trigger signals are applied to the trigger input and a plurality of pulses are thereby generated at the pulse output, wherein each of the plurality of pulses has a constant width and amplitude; a light brightness detector adapted to receive light from a light emitting diode (LED) and output a voltage proportional to the LED light brightness; an operational amplifier having negative and positive inputs and an output, the negative input is coupled to the voltage proportional to the LED light brightness and the positive input of the operational amplifier is coupled to a voltage signal representing a desired light brightness from the LED; and a voltage controlled frequency generator having a frequency control input and a frequency output, wherein the frequency control input is coupled to the output of the operational amplifier, and the frequency output generating the plurality of the trigger signals is coupled to the trigger input of the pulse generating circuit, whereby the voltage controlled frequency source causes the pulse generating circuit to produce the plurality of pulses necessary for producing the desired light brightness from the LED.

BRIEF DESCRIPTION OF THE DRAWINGS

A more complete understanding of the present disclosure may be acquired by referring to the following description taken in conjunction with the accompanying drawings wherein.

Figure 1:
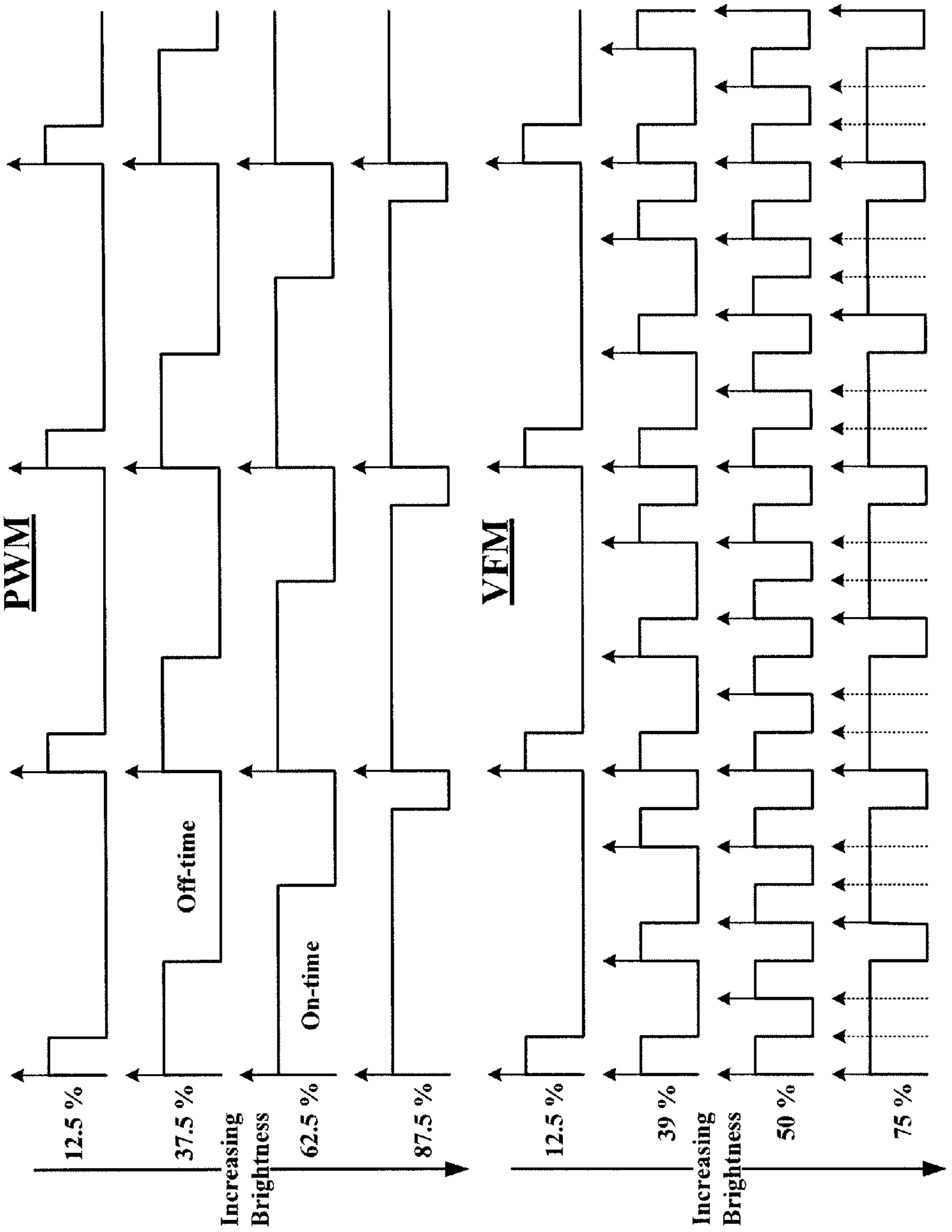
FIG. 1 are schematic timing diagrams of pulse width modulation (PWM) drive signals for comparison with variable frequency modulation (VFM) drive signals for controlling the percent brightness of a light emitting diode (LED), according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of pulse width modulation (PWM) drive signals for comparison with variable frequency modulation (VFM) drive signals for controlling the percent brightness of a light emitting diode (LED), according to the teachings of this disclosure. PWM pulse trains are shown for LED brightness levels of 12.5, 37.5, 62.5 and 87.5 percent. The brightness level percentages correspond to the percentages that the PWM pulse train is at a logic high, i.e., "on," thereby supplying current into the LED (see FIG. 2). The PWM pulse train comprises the same time interval (frequency) between the start of each PWM pulse (indicated by vertical arrows) and varies the "on" time of each of the pulses so as to obtain the desired LED brightness level. This PWM LED intensity control method works but causes concentrated EMI at one frequency over time which may result in a product not meeting strict European and/or USA EMI emission limitations.

According to the teachings of this disclosure, variable frequency modulation (VFM) is used for controlling LED light brightness while reducing EMI generated at any one frequency. VFM pulse trains are shown for LED brightness levels of 12.5, 39, 50 and 75 percent. The brightness level percentages correspond to the percentages that the VFM pulse train is at a logic high, i.e., "on," over a certain time interval (user selectable), thereby supplying current into the LED (see FIG. 2). The VFM pulse train comprises a plurality of pulses, each pulse having the same pulse width ("on" or logic high time duration), that may occur over various time intervals (i.e., various frequencies). The start of each pulse is represented by a vertical arrow. Thus LED intensity may be controlled by adjusting how many VFM pulses occur over the certain time intervals. Granularity of the light brightness control may be improved by using shorter pulse widths (logic high time durations) and thereby more pulses per time interval. The end result in controlling the LED light brightness is the percent that the pulses are "on" during each time interval.

Figure 2:
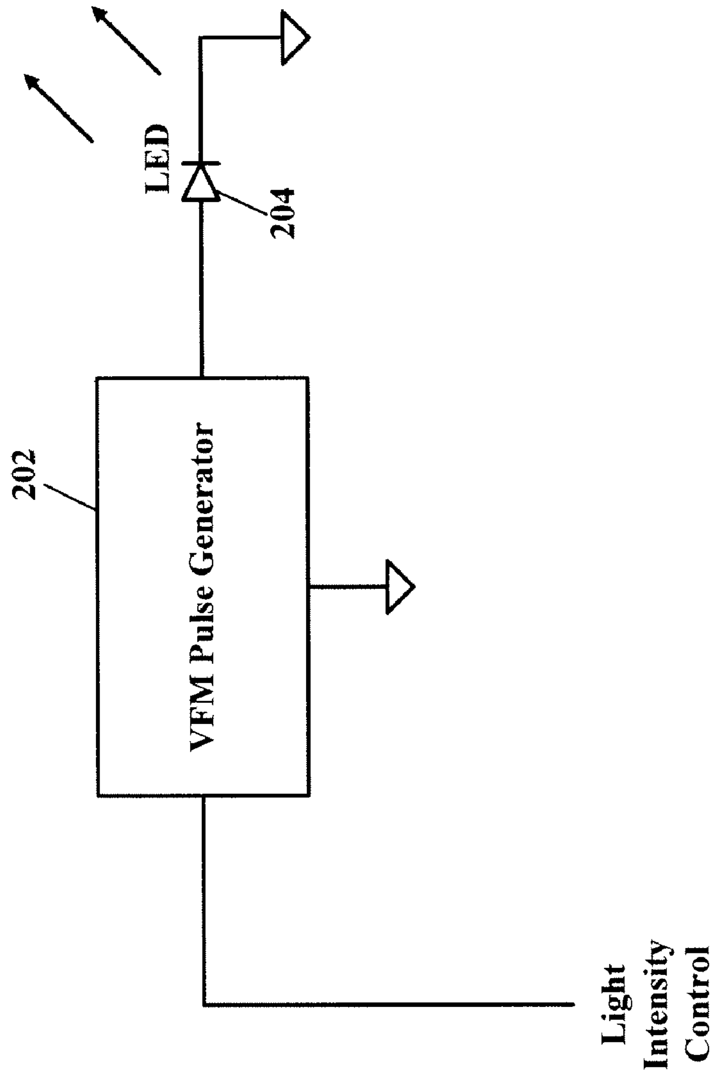
FIG. 2 is a schematic block diagram of a variable frequency modulation (VFM) pulse generator driving a light emitting diode (LED), according to the teachings of this disclosure.

Referring to FIG. 2, depicted is a schematic block diagram of a variable frequency modulation (VFM) pulse generator driving a light emitting diode (LED), according to the teachings of this disclosure. A VFM pulse generator 202 has a VFM pulse train output that drives LED 204 to a desired light brightness. A light brightness control signal is used to indicate to the VFM pulse generator 202 what LED light brightness is desired. The VFM pulse train may vary from no pulses per time interval (zero percent light brightness) to 100 percent on per time interval (maximum light brightness), and a number of pulses per time interval less than the number of pulses for 100 percent on time.

Figure 3:
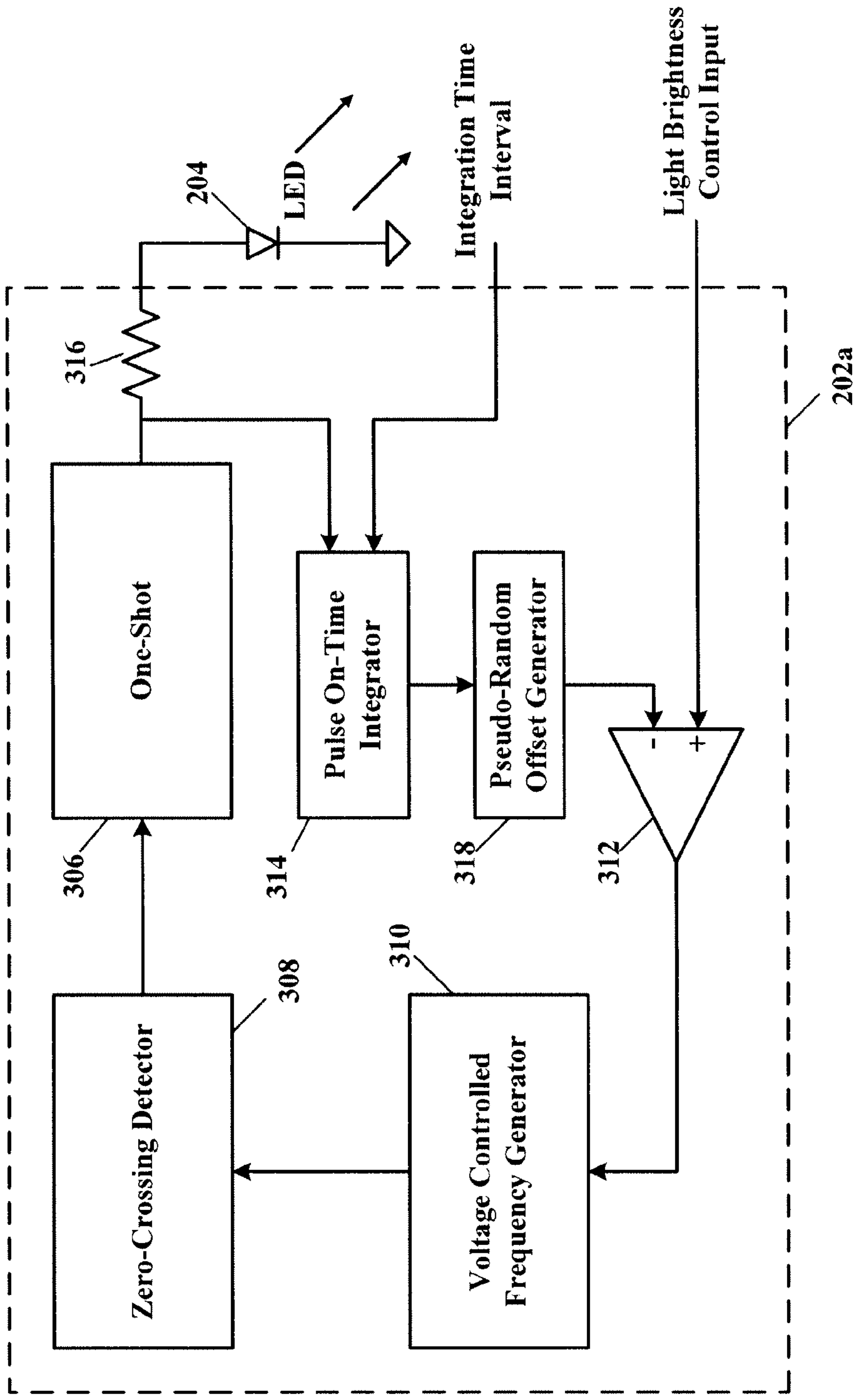
FIG. 3 is a schematic block diagram of a VFM pulse generator driving an LED, according to a specific example embodiment of this disclosure.

Referring to FIG. 3, depicted is a schematic block diagram of a VFM pulse generator driving an LED, according to a specific example embodiment of this disclosure. A VFM pulse generator 202*a* comprises a one-shot 306 having a fixed pulse width (logic high time duration) output, a pulse on-time integrator 314, an operational amplifier 312 having differential inputs, a voltage controlled frequency generator 310, and a zero-crossing detector 308. The one-shot 306 is "fired" (output goes to a logic high for the fixed time duration) whenever a start pulse at its input is detected. These start pulses are supplied from the zero-crossing detector 308 at a repetition rate (pulses per time duration) which is determined from the frequency of the voltage controlled frequency generator 310. The voltage controlled frequency generator 310 may be a voltage controlled oscillator (VCO), voltage-to-frequency converter, etc. A resistor 316 is used to control the amount of current to the LED 204.

The output frequency of the voltage controlled frequency generator 310 is controlled by a voltage from the operational amplifier 312. The operational amplifier 312 compares a light brightness voltage input with a voltage from the pulse on-time integrator 314. The voltage from the pulse on-time integrator 314 is representative of the percent that the output of the one-shot 306 is on during the certain time duration. The operational amplifier 312 has gain and will cause the voltage controlled frequency generator 310 to adjust its frequency so that the "on" time of the pulse train over a certain time duration equals the light brightness voltage input (voltage levels configured to be proportional to percent LED brightness). This arrangement produces a closed loop brightness control for the LED.

According to the teachings of this disclosure, an optional further feature may use a pseudo random offset generator 318 to introduce random voltage perturbations at the voltage input of the voltage controlled frequency generator 310. These random voltage perturbations may further spread EMI noise power over a greater (wider) number of frequencies, and thus reduce the EMI noise power at any one frequency. This is very advantageous when having to meet strict EMI radiation standards. The pseudo random offset generator 318 may be coupled between the pulse on-time integrator 314 and the operational amplifier 312, between the light brightness input and the operational amplifier 312, or between the operational amplifier 312 output and the voltage input of the voltage controlled frequency generator 310. The pseudo-random offset generator 318 may provide additional frequencies to those frequencies resulting from the combination of the light brightness closed loop control and output from the pulse on-time integrator 314.

It is contemplated and within the scope of the disclosure that the light intensity input may be directly coupled to the voltage input of the voltage controlled frequency generator 310 and thus control the number of pulses per time duration results in the percent light brightness desired from the LED without regard to the pulse train on-time average. This arrangement produces an open loop brightness control for the LED.

Figure 4:
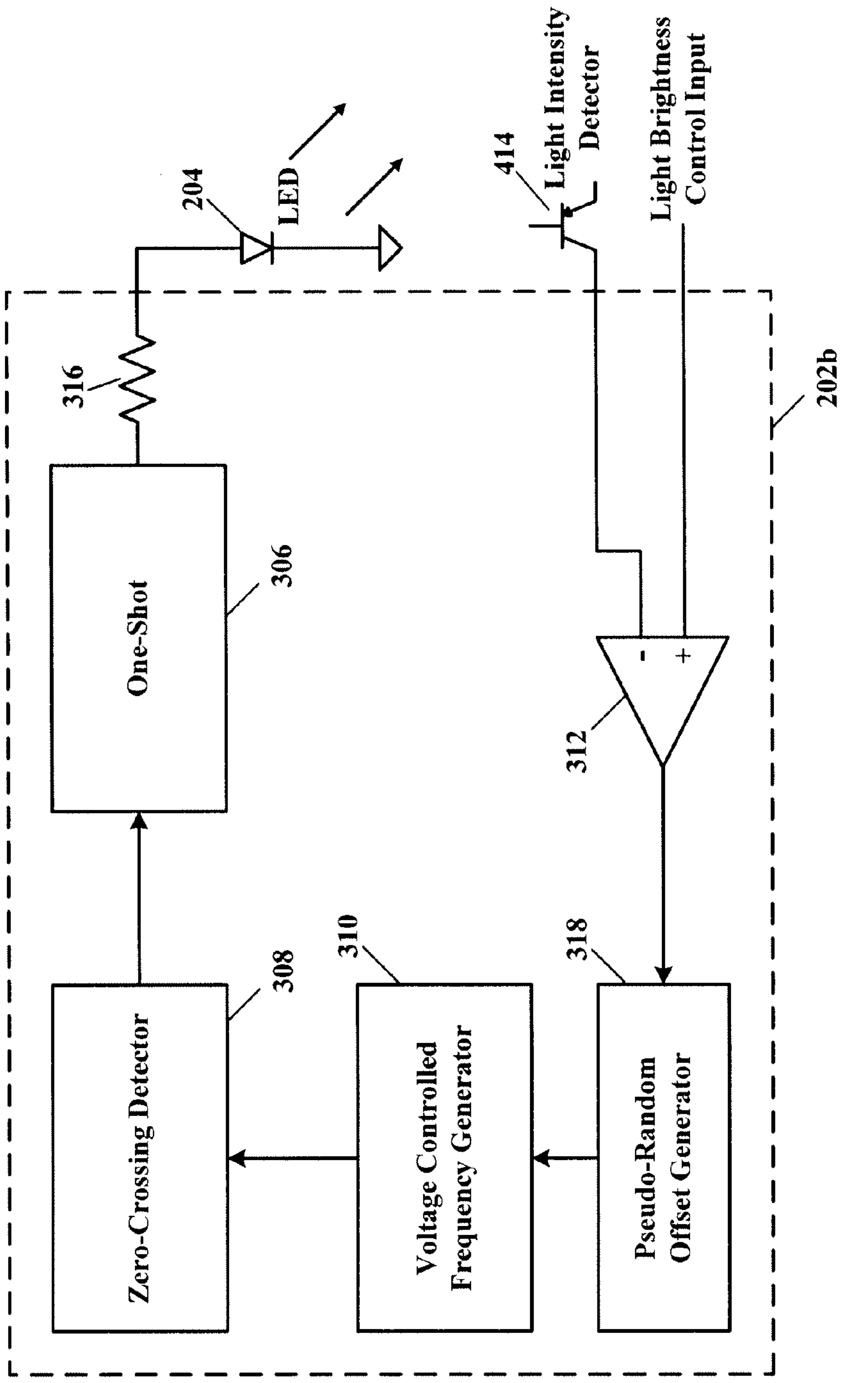
FIG. 4 is a schematic block diagram of a VFM pulse generator driving an LED, according to another specific example embodiment of this disclosure.

Referring to FIG. 4, depicted is a schematic block diagram of a VFM pulse generator driving an LED, according to another specific example embodiment of this disclosure. A VFM pulse generator 202*b* comprises a one-shot 306 having a fixed pulse width (logic high time duration) output, an operational amplifier 312 having differential inputs, a voltage controlled frequency generator 310, a zero-crossing detector 308, and a light brightness detector 414. The one-shot 306 is "fired" (output goes to a logic high for the fixed time duration) whenever a start pulse at its input is detected. These start pulses are supplied from the zero-crossing detector 308 at a repetition rate (pulses per time duration) which is determined from the frequency of the voltage controlled frequency generator 310. The voltage controlled frequency generator 310 may be a voltage controlled oscillator (VCO), voltage-to-frequency converter, etc. A resistor 316 is used to control the amount of current to the LED 204.

The frequency of the voltage controlled frequency generator 310 is controlled by a voltage from the operational amplifier 312. The operational amplifier 312 compares a light intensity voltage input against a voltage from the light brightness detector 414. The voltage from the light intensity detector 414 is representative of the brightness of the LED 204. The operational amplifier 312 has gain and will cause the voltage controlled frequency generator 310 to adjust its frequency so that the brightness of the LED 204 equals the light brightness voltage input (voltage levels configured to be proportional to desired percent LED brightness). This arrangement produces a closed loop brightness control for the LED. An advantage of this configuration is that the pulses to the LED 204 may be adjusted to compensate for light brightness output degradation of the LED 204.

According to the teachings of this disclosure, an optional further feature may use a pseudo-random offset generator 318 to introduce random voltage perturbations at the voltage input of the voltage controlled frequency generator 310. These pseudo-random voltage perturbations may further spread EMI noise power over a greater (wider) number of frequencies, and thus reduce the EMI noise power at any one frequency over time. This is very advantageous when having to meet strict EMI radiation standards. The pseudo random offset generator 318 may be coupled between the voltage input of the voltage controlled frequency generator 310 and the output of the operational amplifier 312, between the light brightness input and the operational amplifier 312, or between the light brightness detector 414 and an input of the operational amplifier 312. The pseudo-random offset generator 318 may provide additional frequencies to those frequencies resulting from the combination of the light intensity closed loop control and output from the light brightness detector 414.

Figure 5:
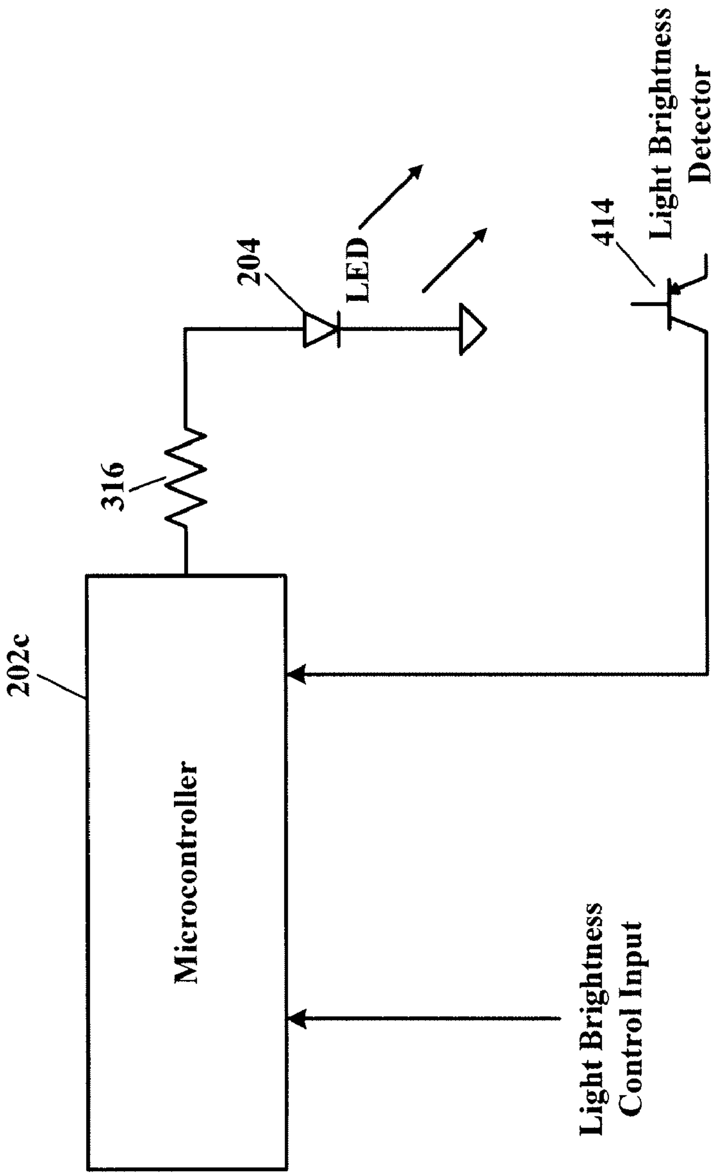
FIG. 5 is a schematic block diagram of a microcontroller configured and programmed to function as a VFM pulse generator driving an LED, according to yet another specific example embodiment of this disclosure.

Referring to FIG. 5, depicted is a schematic block diagram of a microcontroller configured and programmed to function as a VFM pulse generator driving an LED, according to yet another specific example embodiment of this disclosure. A microcontroller 202*c* may be configured as a VFM pulse generator. The microcontroller 202*c* may have analog and/or digital inputs for control of light brightness and light intensity (brightness) detection from a light intensity detector 414. The microcontroller 202*c* generates the fixed pulse width (logic high time duration) output that drives the LED 204 through the current limiting resistor 316 with a software program. The number of fixed width pulses per time duration (frequency) is also controlled with the software program running in the microcontroller 202*c*.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for controlling brightness of a light emitting diode (LED), comprising:

a pulse generating circuit having a trigger input and a pulse output, wherein a plurality of trigger signals are applied to the trigger input and a plurality of pulses are thereby generated at the pulse output, wherein each of the plurality of pulses has a constant width and amplitude;

a pulse on-time integrator having a pulse input coupled to the pulse output of the pulse generating circuit and an integration time interval input, wherein the pulse on-time integrator generates an output voltage proportional to a percent of when the amplitudes of the plurality of pulses are on over an integration time interval;

an operational amplifier having negative and positive inputs and an output, the negative input is coupled to the output voltage from the pulse on-time integrator and the positive input of the operational amplifier is coupled to a voltage signal representing a desired light brightness from a light emitting diode (LED); and a voltage controlled frequency generator having a frequency control input and a frequency output, wherein the frequency control input is coupled to the output of the operational amplifier, and the frequency output generating the plurality of the trigger signals is coupled to the trigger input of the pulse generating circuit, whereby the voltage controlled frequency source causes the pulse generating circuit to produce the plurality of pulses necessary for producing the desired light brightness from the LED.

2. The apparatus according to claim 1, wherein the LED is coupled to the pulse output of the pulse generating circuit.

3. The apparatus according to claim 2, wherein the LED is coupled to the pulse output of the pulse generating circuit through a current limiting resistor.

4. The apparatus according to claim 1, further comprising a zero-crossing detector coupled between the trigger input of the pulse generating circuit and the frequency output of the voltage controlled frequency generator, wherein the plurality of trigger signals are generated from the zero-crossing detector.

5. The apparatus according to claim 1, further comprising a pseudo-random offset generator coupled between the output of the pulse on-time integrator and the negative input of the operational amplifier.

6. The apparatus according to claim 1, further comprising a pseudo-random offset generator coupled between the output of the operational amplifier and the frequency control input of the voltage controlled frequency generator.

7. The apparatus according to claim 1, further comprising a pseudo-random offset generator coupled between the positive input of the operational amplifier and the voltage signal representing the desired brightness of the LED.

8. The apparatus according to claim 1, wherein the voltage controlled frequency generator is a voltage controlled oscillator.

9. The apparatus according to claim 1, wherein the voltage controlled frequency generator is a voltage-to-frequency converter.

10. An apparatus for controlling brightness of a light emitting diode (LED), comprising:

a pulse generating circuit having a trigger input and a pulse output, wherein a plurality of trigger signals are applied to the trigger input and a plurality of pulses are thereby generated at the pulse output, wherein each of the plurality of pulses has a constant width and amplitude;

a light brightness detector adapted to receive light from a light emitting diode (LED) and output a voltage proportional to the LED light brightness;

an operational amplifier having negative and positive inputs and an output, the negative input is coupled to the voltage proportional to the LED light brightness and the positive input of the operational amplifier is coupled to a voltage signal representing a desired light brightness from the LED; and a voltage controlled frequency generator having a frequency control input and a frequency output, wherein the frequency control input is coupled to the output of the operational amplifier, and the frequency output generating the plurality of the trigger signals is coupled to the trigger input of the pulse generating circuit, whereby the voltage controlled frequency source causes the pulse generating circuit to produce the plurality of pulses necessary for producing the desired light brightness from the LED.

11. The apparatus according to claim 10, wherein the LED is coupled to the pulse output of the pulse generating circuit.

12. The apparatus according to claim 11, wherein the LED is coupled to the pulse output of the pulse generating circuit through a current limiting resistor.

13. The apparatus according to claim 10, further comprising a zero-crossing detector coupled between the trigger input of the pulse generating circuit and the frequency output of the voltage controlled frequency generator, wherein the plurality of trigger signals are generated from the zero-crossing detector.

14. The apparatus according to claim 10, further comprising a pseudo-random offset generator coupled between the output of the light brightness detector and the negative input of the operational amplifier.

15. The apparatus according to claim 10, further comprising a pseudo-random offset generator coupled between the output of the operational amplifier and the frequency control input of the voltage controlled frequency generator.

16. The apparatus according to claim 10, further comprising a pseudo-random offset generator coupled between the positive input of the operational amplifier and the voltage signal representing the desired brightness of the LED.

17. The apparatus according to claim 10, wherein the voltage controlled frequency generator is a voltage controlled oscillator.

18. The apparatus according to claim 10, wherein the voltage controlled frequency generator is a voltage-to-frequency converter.

19. A microcontroller for controlling brightness of a light emitting diode (LED), comprising:

a microcontroller having a output and an input, the output is coupled to a light emitting diode (LED) and the input is coupled to a LED light brightness control signal; and the microcontroller generates a control signal comprising a plurality of pulses, wherein the control signal comprising a plurality of time periods and is modulated to vary the number of pulses that present in each time period and wherein each of the plurality of pulses has a constant width and amplitude, and light brightness from the LED is proportional to a percent of time that the plurality of constant width and amplitude pulses are on over an integration time interval, wherein the microcontroller is operable to generate the plurality of pulses at pseudo-random frequencies such that a constant visible light brightness is achieved while EMI noise power is reduced.

20. The microcontroller according to claim 19, further comprising a light intensity detecor generating a light brightness detection signal coupled with an input of the microcontroller.

* * * * *